(12) United States Patent
Lau

(10) Patent No.: US 6,748,238 B1
(45) Date of Patent: Jun. 8, 2004

(54) HANDS-FREE DIGITAL RECORDER SYSTEM FOR CELLULAR TELEPHONES

(75) Inventor: Shek Fai Lau, Foster City, CA (US)

(73) Assignee: Sharper Image Corporation, San Francisco, CA (US)

( * ) Notice: Subject to any disclaimer, the term of this patent is extended or adjusted under 35 U.S.C. 154(b) by 1,003 days.

(21) Appl. No.: 09/669,777

(22) Filed: Sep. 25, 2000

(51) Int. Cl.[7] .................................................. H04B 1/38
(52) U.S. Cl. ......................... 455/556; 455/557; 455/349
(58) Field of Search ........................... 455/556, 569, 455/550, 557, 575, 90, 344, 345, 346–349, 66, 412, 413, 351; 381/86; 379/446, 447, 41, 88.04, 67, 88, 428, 433, 89, 211, 454, 455, 70–85; 343/702; 370/110.4, 111, 118, 493, 494, 495, 527, 528, 529; 704/270, 275, 201; 360/137, 130.21; 365/189.01

(56) References Cited

U.S. PATENT DOCUMENTS

| | | | |
|---|---|---|---|
| 4,881,259 A | * 11/1989 | Scordato | 379/58 |
| 5,477,487 A | 12/1995 | Greenberg | |
| 5,694,452 A | * 12/1997 | Bertolet | 379/51 |
| 5,778,063 A | * 7/1998 | Dunchock | 379/446 |
| 5,797,088 A | * 8/1998 | Stamegna | 455/345 |
| 5,867,793 A | * 2/1999 | Davis | 455/556 |
| 5,903,868 A | 5/1999 | Yuen et al. | |
| 6,027,828 A | * 2/2000 | Hahn | 429/100 |
| 6,028,930 A | * 2/2000 | Chen | 379/446 |
| 6,058,319 A | * 5/2000 | Sadler | 455/569 |
| 6,138,041 A | 10/2000 | Yahia | |
| 6,243,594 B1 | * 6/2001 | Silberfenig | 455/556.1 |
| 6,266,544 B1 | * 7/2001 | Tomura et al. | 455/572 |
| 2002/0071656 A1 | * 6/2002 | Boys | 386/69 |

* cited by examiner

*Primary Examiner*—Edward F. Urban
*Assistant Examiner*—C. Chow
(74) *Attorney, Agent, or Firm*—Fliesler Meyer LLP

(57) ABSTRACT

A digital recorder system for use with cellular telephones includes a housing that defines a cavity into which a cellular telephone may be received. During cellular telephone use, a microphone disposed on the housing records sounds, and a speak disposed within the housing plays back sound. A digital recorder within the housing automatically records the past twenty-seconds of conversation. A user may press a control button on the housing to retain up to four such twenty-second segments, and may press another control button on the housing to record sound prospectively. An LED on the housing confirms operational mode of the system.

41 Claims, 3 Drawing Sheets

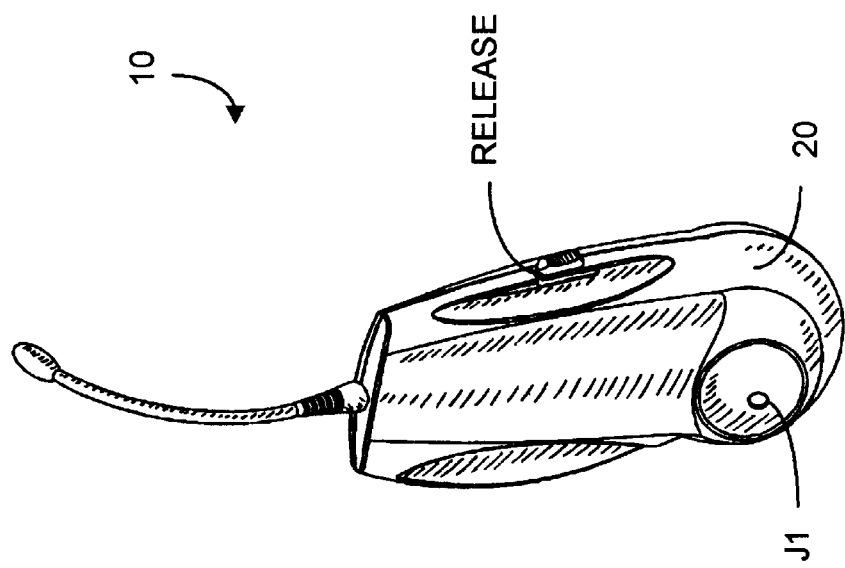
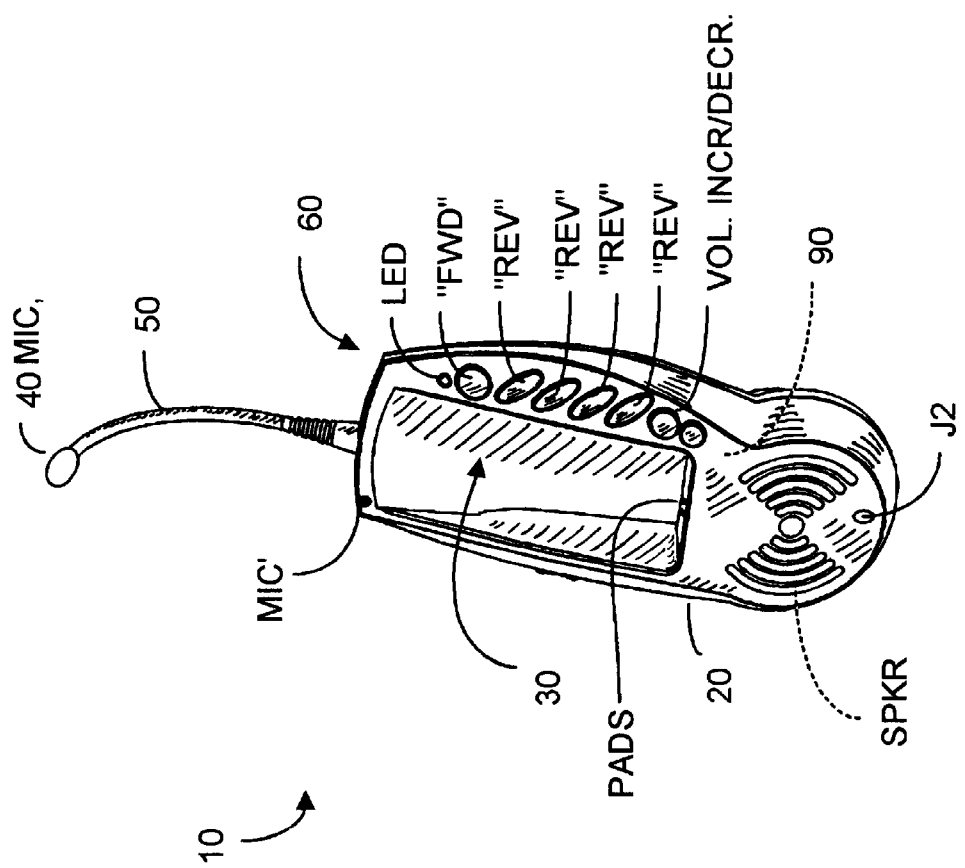
FIG. 1B
FIG. 1A

HANDS-FREE DIGITAL RECORDER SYSTEM FOR CELLULAR TELEPHONES

FIELD OF THE INVENTION

The invention relates generally to digital recorders and cellular telephones, and more particularly to providing a digital recorder for recording cellular telephone calls when the user's hands are not free for purposes of recording, while driving for example.

BACKGROUND OF THE INVENTION

Cellular telephones are used more and more frequently, but often under circumstances where the user's hands are not completely free. Such cellular telephone usage can be hazardous to the user and to nearby persons, for example when the user is simultaneously operating a motor vehicle and communicating on a cellular telephone. The risk of hazard is escalated when the nature of the cellular communication is such that the user feels compelled to take notes. Understandably, operating a motor vehicle, while communicating on a cellular telephone and taking notes, simultaneously, is not to be recommended.

While some cellular telephone units have accessories that permit the user to wear a microphone-earphone headset, using such apparatus is sometimes cumbersome, especially as it is necessary to store the apparatus until it is actually used.

While small portable tape recorders are known in the art, and could be used to record cellular telephone communications, operating a motor vehicle, a cellular telephone, and a recorder simultaneously is not an especially safe undertaking.

What is needed is a hands-free preferably digital recorder system that can automatically record cellular telephone communications. Such a system should be operable in a motor vehicle and should not require substantial user attention during operation.

The present invention provides such a recorder system.

SUMMARY OF THE PRESENT INVENTION

The present invention provides a system that includes a cradle, sized to accept a cellular telephone and, disposed within the cradle housing, a system including a digital recorder with memo recording and backwards recorder functions, and a speaker phone function. The system is operable from a motor vehicle 12 VDC cigarette plug accessory voltage, and can charge the user's cellular telephone when not in use.

A user's cellular telephone is inserted into a recess in the cradle, which action powers-on the present invention. A microphone associated with the present invention detects ambient sound for potential recording by the digital recorder, and a loudspeaker associated with the present invention plays sound, including sound enunciated from the user's cellular telephone (e.g., sound from the person on the other end of the cellular telephone conversation).

The digital recorder operates continuously when the cellular telephone is in use, except during playback of a recorded message.

The user presses the "Forward Record" button to begin recording for up to 30 seconds, whereupon the LED flashes red, and remains red to indicate a recorded message is present. The same button is again pressed for playback, during which time the LED turns green. Pressing the same button momentarily will pause playback, and pressing and holding the same button for a predetermined time erases the message, whereupon the LED extinguishes.

The user may press a "Backward Record" button to capture the last 20 seconds of cellular telephone conversation, whereupon the LED remains steady red to indicate a recorded message is present. The same button may be pressed for playback, during which time the LED is steady green. The same button may be pressed and held for a predetermined time to delete the message, whereupon the LED turns off, to indicate the message location is empty.

Other features and advantages of the invention will appear from the following description in which the preferred embodiments have been set forth in detail, in conjunction with the accompanying drawings.

BRIEF DESCRIPTION OF THE DRAWINGS

FIG. 1A is a perspective front view of a preferred embodiment of the present invention;

FIG. 1B is a perspective rear view of the embodiment of FIG. 1A;

DETAILED DESCRIPTION OF THE PREFERRED EMBODIMENT

Figure 2B:
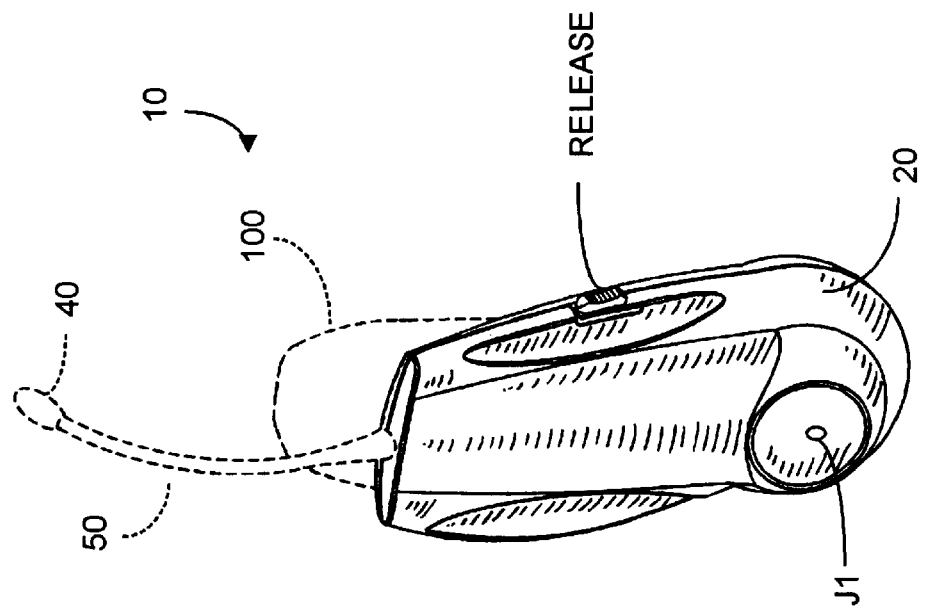
FIG. 2B is a perspective rear view of the embodiment of FIG. 2A.

FIG. 1A depicts the present invention as a system 10 that includes a cradle-like housing 20 that defines a cavity 30 sized to accept and retain a user's cellular telephone. Electrical pads at the base of the cavity are positioned to make electrical contact with a cellular telephone inserted into cavity 30, whereupon the present invention can charge the internal batteries within the cellular telephone during periods of non-use.

System 10 includes a microphone 40 that may be disposed at the end of a stalk 50 attached to housing 20. Alternatively a microphone (MIC') may be installed directly into housing 20. The user-facing surface of housing 20 includes several user-operable controls 60 as well as a preferably multi-color LED that signals the operational mode of system 10. Within housing 20 is disposed a digital recorder system 90, and a speaker (SPKR) for playing sound emanating from a cellular telephone inserted into cavity 30. A "RELEASE" button on the left side of the housing facilitates attaching and releasing a cellular telephone from the housing. A user-operable volume control is also provided, to control speaker volume or, if earphones are instead used, earphone volume.

As noted, several user-operable controls 60 are provided. One such control is a forward memo control "Forward" button that is used for forward mode Record, Playback, and Erase. By forward memo it is meant that sounds are recorded for up to 30 seconds from the time the "Forward" button is pressed. When this button is pressed, the LED flashes red and up to 30 seconds of recording now takes place. The LED will glow steadily red once the recording is made, to indicate a message is present. The same "Forward" button may be pressed again to playback the message, during which time the LED glows steadily green. Playback may be paused by pressing the same "Forward" button and may be resumed by again pressing the same button. The forward mode recorded message may be deleted by pressing the same "Forward" button for a predetermined time, e.g., about 30 seconds. Once the message has been erased from memory associated with the digital recorder, the LED turns off, to indicate the message location is now empty.

It may be the case that immediately after a cellular conversation has occurred, it is deemed desirable to have recorded the conversation. Four of the buttons among the control 60 buttons are reverse mode "REV" buttons. By default, the digital recorder within the present invention operates continuously while the cellular telephone is in use, except during playback of a recorded message. During recording, the LED will flash red.

A user need only press one of the four elliptically shaped "REV" buttons to capture within the digital recorder the last 20 seconds of cellular telephone conversation. The LED will glow steadily red after recording to indicate that a message is present. There are four such elliptical "REV" buttons, and pressing each can record a different last 20 seconds of conversation. Pressing one of these "REV" buttons will replay the message recorded at the associated digital recorder memory location. Playback of a recorded message may be halted by pressing the associated "REV" button during playback, and again pressing the same button will resume playback. Deleting one of the 20 second messages is accomplished by pressing and holding the associated "REV" button for a predetermined time, e.g., three seconds, whereupon the LED turns off, to indicate that memory location is now empty.

Figure 2A:
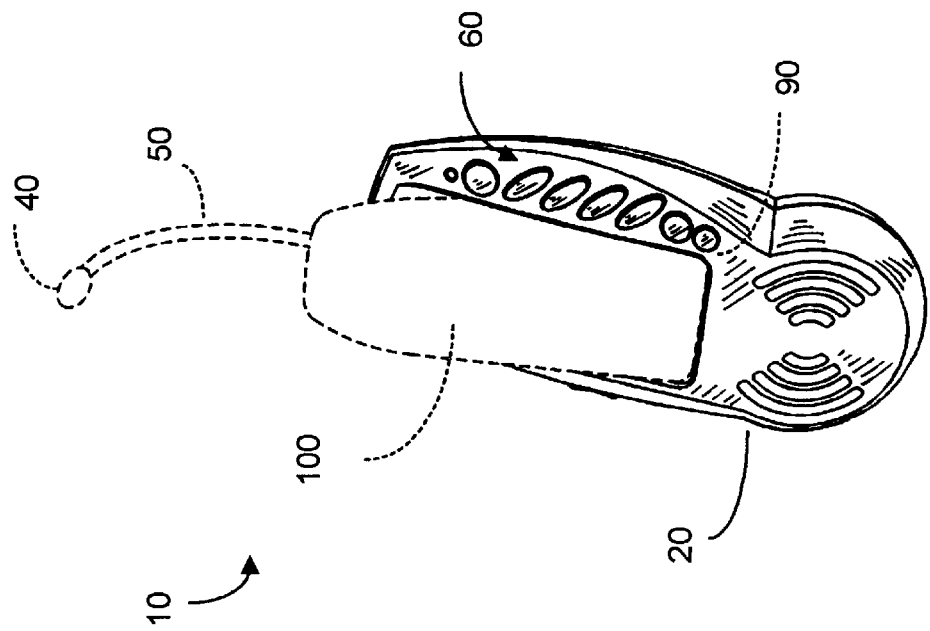
FIG. 2A is a perspective front view of a preferred embodiment of the present invention, retaining a cellular telephone, shown in phantom.

FIGS. 2A and 2B show a cellular telephone 100 (indicated in phantom) plugged into cavity 30. In the preferred embodiments, electrical pads (PADS) disposed in the bottom of cavity 30 are coupled to power supply voltage, and permit recharging the internal battery within cellular telephone 100. The PADS in cavity 30 are sized to contact associated PADS on the lower housing of cellular telephone 100. Note in FIG. 2A that the microphone 40 and stalk 50 are shown in phantom, again indicating that a built-in microphone MIC' may instead be used. The RELEASE button shown in FIGS. 1B and 2B is a spring-loaded mechanism that engages and retains a portion of cellular telephone 100 when in cradle cavity 30, and permits releasing the cellular telephone otherwise. A power input jack J1 is shown in FIGS. 1B and 2B, for receiving typically +12 VDC from an external power source, typically a motor vehicle battery, as supplied via the cigarette lighter accessory voltage in the vehicle.

Figure 3:
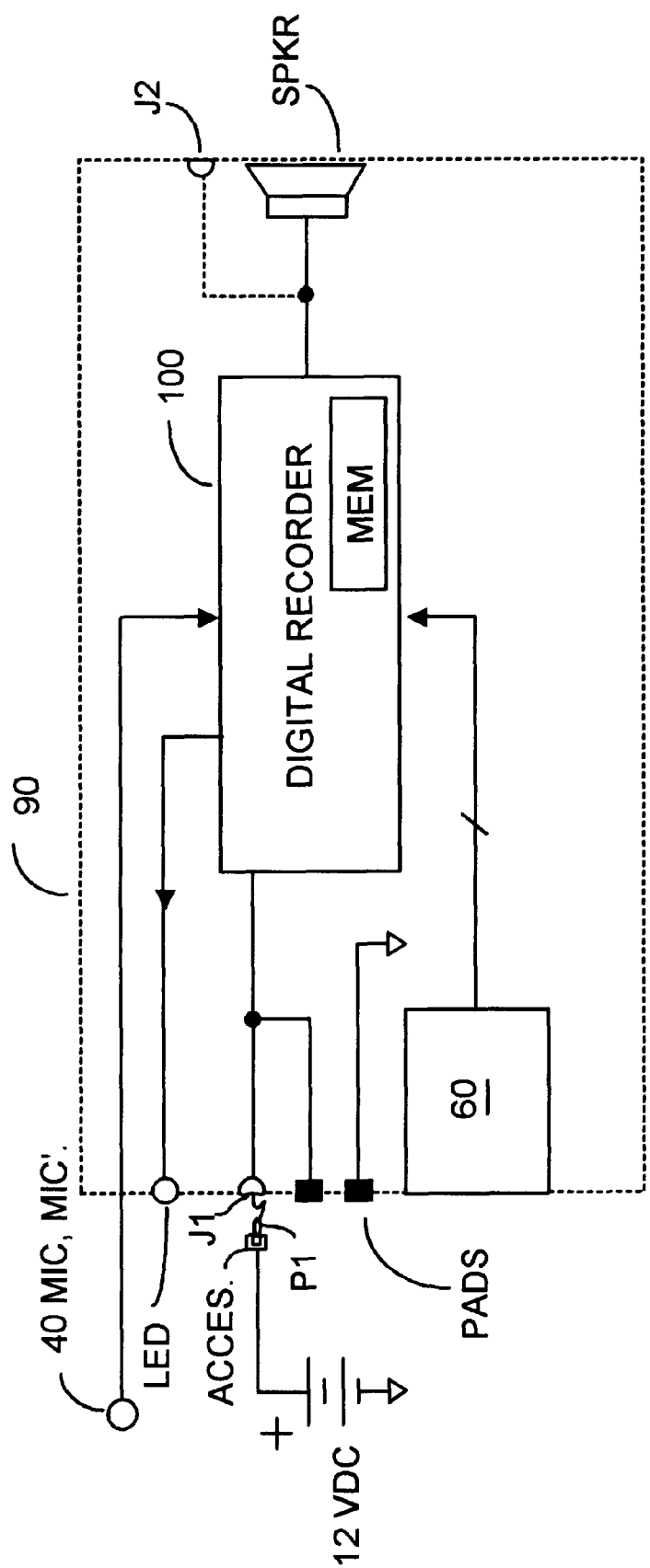
FIG. 3 is a block diagram of the present invention.

Turning now to FIG. 3, electronics system 90 includes a digital recorder 100 with associated memory (MEM). Power to system 90 is typically achieved via jack J1, namely by a power cord that terminates with a cigarette-lighter sized plug P1 that fits into the dashboard accessory socket (ACCESS.) from which +12 VDC is provided. FIG. 3 also shows the PADS mounted on the device housing, for providing battery recharge potential to the cellular telephone when the telephone is placed within housing 20.

The various user-operable controls 60 are coupled as input to digital recorder 100 to control its operation as described above. Microphone input from MIC (or MIC') is coupled to the digital recorder, and output from the digital recorder is coupled to the loudspeaker (SPKR) and/or earphones connected to earphone jack J2. In the preferred embodiment, use of earphones disables the speaker, thus disabling the speaker phone function.

It will be appreciated that the present invention facilitates safer use of a cellular telephone, especially in a motor vehicle environment. The ability to record the last twenty-seconds of conversation by default is especially convenient when one forgets to press the forward mode button at the onset of a conversation. The forward mode button is intentionally made circular, whereas the four reverse mode buttons are elliptical, such that a user can by feel alone know which button is about to be pressed.

Even if not used in a record mode, in the absence of earphones the present invention functions as a high quality speaker telephone, which means the user can concentrate on operating the motor vehicle with which the present invention may be used.

Modifications and variations may be made to the disclosed embodiments without departing from the subject and spirit of the invention as defined by the following claims. Although the present invention has been described with respect to use in a motor vehicle, it is understood that use other than within a motor vehicle may also be undertaken.

What is claimed is:

1. A digital recorder system for use with cellular telephones, comprising:

a housing defining a cavity sized to receive a cellular telephone;

a microphone disposed on said housing;

a speaker disposed within said housing;

a digital recorder disposed within said housing; and at least two user operable controls disposed on said housing, including a control enabling forward mode recording of a conversation made with a cellular telephone disposed in said cavity, and including a control enabling reverse mode retention of a recording automatically made by said digital recorder.

2. A digital recorder system, comprising:

a housing;

a recording means for recording sound within the housing, the recording means being adapted to connect with a cellular telephone such that the recording means can receive sounds from the cellular telephone;

a microphone connected with the recording means;

a speaker connected with the recording means; and a control means for controlling the recording means connected with the recording means, the control means including:

at least one activation means for activating the recording means to store a subsequently received sound; and at least one capture activation means for activating the recording means to store a previously received sound.

3. The digital recorder system of claim 2, further comprising an indication means for indicating a state of the recording means, the indication means being connected with the recording means.

4. The digital recorder of claim 2, wherein the housing includes a cradle for holding the cellular telephone.

5. The digital recorder system of claim 3, wherein the housing includes a release button for releasing the cellular phone from the cradle.

6. The digital recorder system of claim 2, wherein the housing includes a power jack.

7. The digital recorder system of claim 6, wherein the power jack includes a plug adapted to connect with a dashboard socket.

8. The digital recorder system of claim 6, wherein the housing includes electrical pads adapted to contact electrical pads of the cellular telephone.

9. The digital recorder system of claim 2, further comprising an earphone jack connected with the recording means.

10. The digital recorder system of claim 9, wherein when an earphone is connected with an earphone jack, the speaker is disabled.

11. The digital recorder system of claim 2, further comprising a stalk having a proximal end and a distal end, wherein the proximal end is connected with the housing and the distal end is connected with the microphone.

12. The digital recorder system of claim 2, wherein the control means further includes a means for controlling speaker volume level.

13. The digital recorder system of claim 12, wherein the means for controlling speaker volume level includes a volume increase button and a volume decrease button.

14. The digital recorder system of claim 2, wherein the at least one activation means includes a forward button connected with the housing.

15. The digital recorder system of claim 2, wherein the at least one capture activation means includes four reverse buttons connected with the housing.

16. The digital recorder system of claim 2, wherein the indication means is an LED.

17. A digital recorder system for use with cellular telephones, comprising:
    a housing having a cavity adapted for receiving a cellular telephone;
    a digital recorder disposed within the housing, the digital recorder being adapted to connect with the cellular telephone such that the digital recorder receives sounds produced by the cellular telephone;
    a speaker disposed within the housing, the speaker being adapted to produce sounds emanating from one of the cellular telephone and the digital recorder; and
    at least one reverse control connected with the housing, the at least one reverse control being adapted to prompt the digital recorder to store a previously received sound.

18. The digital recorder system of claim 17, further comprising:
    at least one forward control connected with the housing, the at least one forward control being adapted to prompt the digital recorder to store a subsequently received sound.

19. The digital recorder system of claim 18, further comprising:
    at least one volume control adapted to allow at least one of increasing and decreasing the volume of the speaker.

20. The digital recorder system of claim 19, wherein each of the at least one reverse control, the at least one forward control and the at least one volume control is one of a button, a knob, a switch, a slide lever and a touch-sensitive pad.

21. The digital recorder system of claim 17, further comprising:
    a microphone connected with the housing.

22. The digital recorder system of claim 17, further comprising a power jack connected with the housing.

23. The digital recorder system of claim 22, wherein the power jack includes a plug adapted to connect with a dashboard socket.

24. The digital recorder system of claim 17, wherein the housing includes electrical pads adapted for contacting electrical pads of the cellular phone.

25. The digital recorder system of claim 17, further comprising an earphone jack connected with the housing.

26. The digital recorder of claim 25, wherein when an earphone is connected with an earphone jack, the speaker is disabled.

27. The digital recorder of claim 17, further comprising a stalk having a proximal end and a distal end, wherein the proximal end is connected with the housing and the distal end is connected with the microphone.

28. The digital recorder of claim 17, wherein the housing includes a release button for releasing the cellular telephone from the cradle.

29. A digital recorder system for use with cellular telephones, comprising:
    a housing having a cavity adapted for receiving a cellular telephone;
    a digital recorder disposed within the housing, the digital recorder being adapted to continuously record signals received from the cellular telephone;
    at least one of a speaker and an earphone jack connected with the housing and adapted to produce sounds from signals emanating from one of the cellular telephone and the digital recorder; and
    at least one reverse control connected with the housing, the at least one reverse control being adapted to prompt the digital recorder to store a previously received signal;
    wherein signals are one of sounds and digital information.

30. The digital recorder system of claim 29, further comprising:
    at least one forward control connected with the housing, the at least one forward control being adapted to prompt the digital recorder to store a subsequently received signal.

31. The digital recorder system of claim 30, further comprising:
    at least one volume control adapted to allow at least one of increasing and decreasing the volume of at least one of the speaker and the earphone jack.

32. The digital recorder system of claim 31, wherein each of the at least one reverse control, the at least one forward control and the at least one volume control is one of a button, a knob, a switch, a slide lever and a touch-sensitive pad.

33. The digital recorder system of claim 29, further comprising a power jack connected with the housing.

34. The digital recorder system of claim 33, wherein the power jack includes a plug adapted to connect with a dashboard socket.

35. The digital recorder system of claim 29, wherein the housing includes electrical pads adapted for contacting electrical pads of the cellular phone.

36. The digital recorder system of claim 29, further comprising:
    a microphone connected with the housing.

37. The digital recorder of claim 36, further comprising a stalk having a proximal end and a distal end, wherein the proximal end is connected with the housing and the distal end is connected with the microphone.

38. A digital recorder system for use with cellular telephones, comprising:
    a housing defining a cavity sized to receive a cellular telephone, the housing being adapted to be placed on a desk;
    a microphone disposed on said housing;
    a speaker disposed within said housing;
    a digital recorder disposed within said housing, the digital recorder being adapted to automatically record conversations made with the cellular telephone;

a first user operable control adapted for enabling forward mode retention of a conversation made with the cellular telephone; and a second user operable control adapted for enabling reverse mode retention of a recording automatically made by said digital recorder.

39. A digital recorder system, comprising:

a housing for receiving at least one of a cellular telephone, a telephone line, and a telephone handset, the housing being adapted to be placed on at least one of a desk and a wall;

a microphone disposed on said housing;

a speaker disposed within said housing;

a digital recorder disposed within said housing, the digital recorder being adapted to automatically record sounds communicated through the digital recorder;

a first user operable control adapted for enabling forward mode retention of a recording automatically made by the digital recorder; and a second user operable control adapted for enabling reverse mode retention of a recording automatically made by said digital recorder.

40. The digital recorder system of claim 39, wherein when a user fails to answer an incoming call from a caller, the digital recorder can play a preselected outgoing message and subsequently record an incoming message from the caller.

41. A digital recorder system, comprising:

a housing;

a microphone disposed on said housing;

a speaker disposed within said housing;

a digital recorder disposed within said housing; and at least two user operable controls disposed on said housing, including a control enabling forward mode recording of a conversation made over a telephone, and including a control enabling reverse mode retention of a recording automatically made by said digital recorder.

* * * * *

UNITED STATES PATENT AND TRADEMARK OFFICE
CERTIFICATE OF CORRECTION

PATENT NO. : 6,748,238 B1  Page 1 of 1
DATED : June 8, 2004
INVENTOR(S) : Lau

It is certified that error appears in the above-identified patent and that said Letters Patent is hereby corrected as shown below:

<u>Title page,</u>
Item [*] Notice, delete "by 1003" and insert -- by 525 days --.

Signed and Sealed this

Thirtieth Day of May, 2006

JON W. DUDAS
*Director of the United States Patent and Trademark Office*